United States Patent [19]

Conrad et al.

[11] Patent Number: 5,613,307
[45] Date of Patent: Mar. 25, 1997

[54] HEATABLE ROLL FOR THE TREATMENT OF WEBS OF MATERIAL AS WELL AS METHOD FOR THEIR OPERATION

[75] Inventors: Hans-Rolf Conrad, Dormagen; Dirk Cramer, Duisburg, both of Germany

[73] Assignee: Voith Sulzer Finishing GmbH, Krefeld, Germany

[21] Appl. No.: 439,927

[22] Filed: May 12, 1995

[30] Foreign Application Priority Data

May 26, 1994 [DE] Germany .................. 44 18 344.5

[51] Int. Cl.$^6$ ...................................... F26B 7/00
[52] U.S. Cl. ................ 34/425; 34/446; 34/455; 34/114; 34/125
[58] Field of Search ............... 34/306, 307, 309, 34/311, 425, 418, 419, 446, 454, 455, 528, 582, 585, 94, 95, 109, 113, 114, 119, 125, 636; 100/38, 93 RP

[56] References Cited

U.S. PATENT DOCUMENTS 4,748,906  6/1988  Ashmore .................. 100/93 RP
4,942,675  7/1990  Sundqvist ................. 34/446 X Primary Examiner—John M. Sollecito
Assistant Examiner—Steve Gravini
Attorney, Agent, or Firm—Townsend and Townsend and Crew LLP

[57] ABSTRACT

A jacket with a thermally insulating layer partially surrounds, at a small spacing, a heatable roll which serves for the treatment of webs of material, in particular paper webs. Under production conditions the jacket reduces heat losses from the roll through convection and radiation to the environment. The jacket has a device which, with an interruption of production, ensures a forced convection at the heated roll for the cooling of the surface to a temperature level which is same or only insubstantially higher than in the production state. Several cooling nozzles are conceivable for the said apparatus which are secured to the jacket and direct a coolant onto the roll surface.

9 Claims, 1 Drawing Sheet

HEATABLE ROLL FOR THE TREATMENT OF WEBS OF MATERIAL AS WELL AS METHOD FOR THEIR OPERATION

The invention relates to a heatable roll for the treatment of webs of material, in particular paper webs, comprising a jacket which is arranged at a small spacing from the roll and partly surrounds the latter and which is formed as thermal insulation to avoid heat losses to the environment arising under production conditions.

BACKGROUND OF THE INVENTION

Furthermore the invention is directed to a method for operating such a heatable roll.

Heatable rolls are known in the form of rolls with displacement bodies, for example from DE-PS 28 14 244, as rolls with peripheral bores in the roll jacket for the throughflow of a heat carrier from DE-OS 38 38 726, or as rolls with deflection compensation via hydrostatic support elements from DE-PS 35 16 535.

It is known from DE-OS 41 30 672 to cool such heated rolls over their entire length from the outside when the heat generated in the roll interior is no longer led away via the web of material such as is, for example, the case when a tear arises in the web of material. Through this cooling it is intended to ensure that the roll does not heat up too much, which would necessarily have the consequence of a change of the diameter profile.

In the event of web tearing, it is not possible to achieve a situation by interrupting the supply of the heat carrier medium to the heated roll such that a disturbing increase of the surface temperature of the roll does not occur. The reason for this is that the high temperature gradient which exists from the inner side of the roll jacket to its surface means that the roll can only react sluggishly with respect to temperature changes.

It is also already known to encapsulate rapidly running heated rolls in thermal insulation and thus to avoid disturbing heat losses to the environment by convection and radiation during the normal operation of the roll. The presence of such thermal insulation leads, with tearing of the web of material, to an increase in the problem with respect to the temperature increases which occur.

SUMMARY OF THE INVENTION

The object of the invention is to provide a heatable roll for the treatment of material webs which permits the difficulties indicated to be at least substantially overcome and which ensures that the desired diameter profile of the roll can be maintained even in the case of the occurrence of tears in the web of material.

This object is satisfied in accordance with the invention by the features of patent claim 1. Particularly advantageous layouts are set forth in the subordinate claims.

Through the measures of the invention one succeeds, on the one hand, in ensuring a high thermal insulation of the roll during normal operation and, on the other hand, in ensuring that no heating-up effects of the roll occur with an interruption of the production which would lead to disturbing diameter profile changes. This has the consequence that, after an interruption of operation, impermissibly high temperature effects on the web of material are avoided on renewed running up of the plant. Moreover, with paper webs for example it means one can ensure, after the renewed running up of the plant, that parameters such as gloss or smoothness already correspond to the desired values present before interruption of the operation.

It is particularly advantageous that the insulating jacket of the heatable roll is simultaneously exploited as a carrier for the coolant supplies, whereby turbulence can be provided by the radial introduction of the coolant medium into the narrow gap between the roll and the jacket which greatly promotes the required cooling effect and its uniform effectiveness over the entire roll surface.

DESCRIPTION OF THE PREFERRED EMBODIMENT

Figure 1:
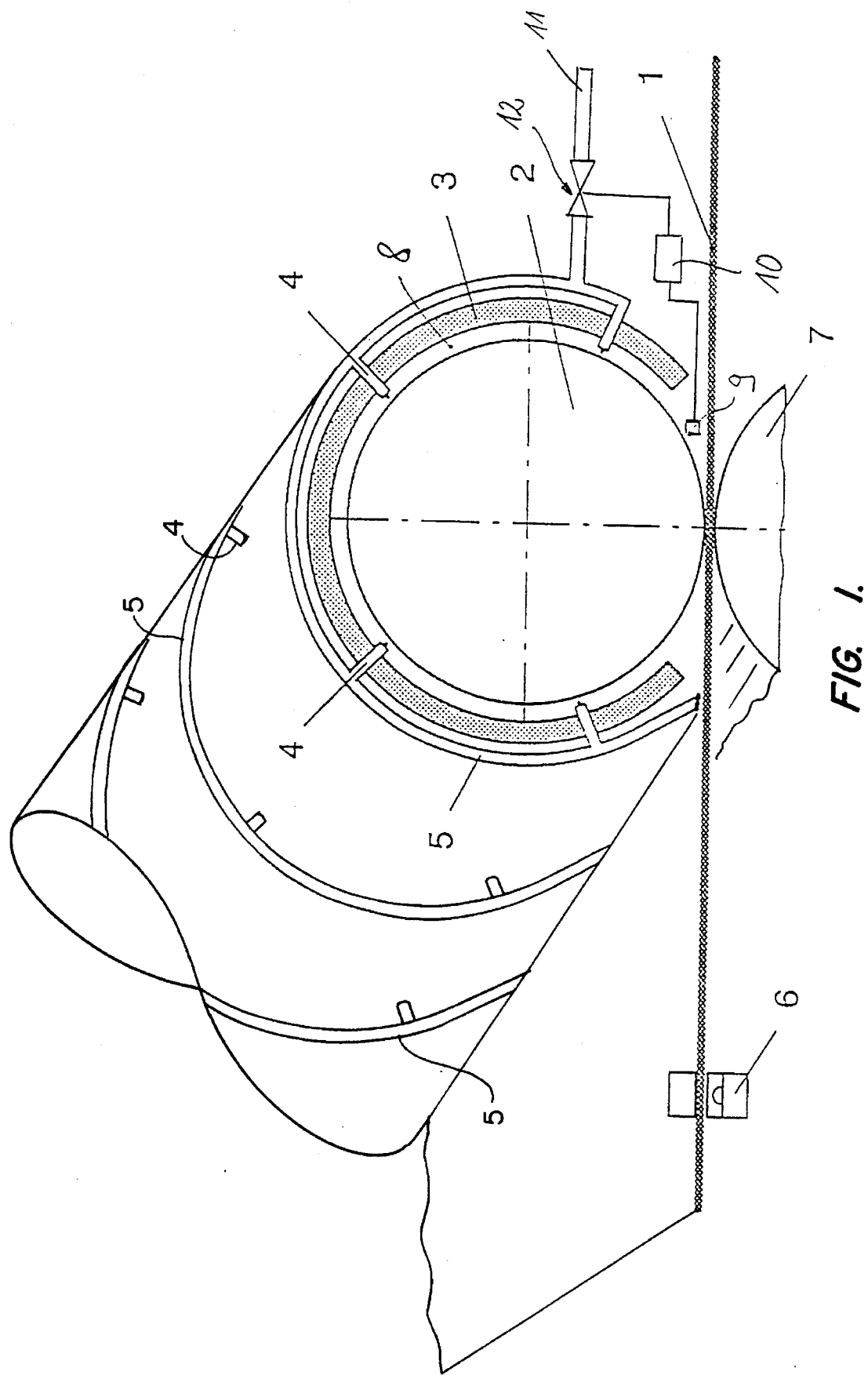
FIG. 1 is embodiment of the invention showing a schematic perspective view of a heated roll treating a web of material, with the heated roll being surrounded by a jacket into which a plurality of cooling nozzles is integrated, so that the construction ensures both insulation and also a cooling function upon web interruption.

A web of material 1 is guided between the heated roll 2 effecting the treatment and a counter-roll 7. The heated roll is partly surrounded by a rigidly formed jacket 3 of a thermally insulating material, with this jacketing of the roll 2 preferably being so executed that the larger part of the roll 2 is surrounded, with the jacket 3 terminating adjacent to the respective web of material 1 so that it does not impair the run of this web.

The jacket 3 is secured in non-illustrated manner to the roll frame or to the roll mounting.

Cooling nozzles 4 which are distributed in the peripheral direction and in the axial direction over the length of the roll 2 are arranged and preferably mounted in the jacket 3 consisting of insulating or isolating material.

These cooling nozzles 4 are directed towards the roll surface and preferably extend in the gap space 8 between the roll 2 and the jacket 3. An additional mounting for the nozzles and also for the feedlines can be dispensed with. This task is taken on by the stable and rigidly formed jacket 3.

Provision can also be made for the nozzles 4 to be so held in the jacket that their direction can be changed relative to the roll surface in order to provide specific turbulent conditions in this manner.

A plurality of nozzles 4 is preferably mounted in the jacket 3 so that all regions of the roll surface can be substantially uniformly subjected to cooling fluid, in particular cooling air, or—if this is desired as a result of the particular circumstances—can be differentially fed with cooling fluid, in particular cooling air, when considered over the length of the roll.

The nozzles 4 are supplied with the cooling fluid, which can also be a liquid, from the outside via supply lines 5, and indeed from the point of time onwards at which a sensor, consisting for example of a light barrier, signalizes an interruption of the product operation and thus determines that, for example, the web of material 1 is torn.

The supply of the cooling liquid to the nozzles 4 can take place via a metering valve 12 or several metering valves 12, with certain groups of nozzles being able to be associated with the respective metering valve 12. In this manner it is possible, for all desired surface temperatures, to make available the quantity of cooling fluid required for the maintenance of the surface temperatures. In this respect, care can also be taken to ensure that the cooling nozzles 4 can be differentially energized in the axial direction in order to vary the cooling effect over the length of the roll.

An automation or control or regulation of the supply of cooling fluid is also possible in that the roll surface temperature is detected by means of a sensor 9, or by means of several such sensors, and the respective metering valve 12 is influenced via a positioning unit 10.

By means of the described apparatus it is possible, during an interruption in production, in particular with a tear of the web of material, to introduce cooling fluid into the gap space 8 between the jacket 3 and the heated roll 2 and to select the volume quantity of cooling fluid supplied per unit of time in such a way that the surface temperature of the roll is kept at least substantially at the desired temperature required for normal production.

After overcoming the interruption of production the cooling fluid supply is switched off and the jacket 3 which serves as a guide and conduction surface for the cooling fluid during the interruption of production can again resume its main function as a unit for preventing heat losses, with the presence of the integrated cooling fluid supplies not disturbingly impairing this function.

What is claimed is:

1. A heated roll and counter roll for treatment of a continuous sheet of goods in web form passing between the heated roll and the counter roll comprising:

a first heated roll rotatable about an axial length of a first axis;

a second counter-roll rotatable about a second axis parallel to the first axis, the second counter-roll contacting the continuous sheet of goods in web form along a line of contact with the first heated roll;

a formed thermally insulating jacket defining a narrow interface around the first heated roll extending from the continuous sheet of goods in web form on a first side of the first heated roll to the continuous sheet of goods in web form on a second side of the first heated roll;

a plurality of air nozzles at staggered radial locations relative to the first heated roll, the plurality of air nozzles extending through the formed thermally insulating jacket for supplying cooling air to the narrow interface between the formed thermally insulating jacket and the first heated roll; and, manifold means for providing cooling fluid to the plurality of nozzles upon interruption of web movement between the first heated roll and the second counter roll.

2. A heated roll and counter roll for treatment of a continuous sheet of goods in web form according to claim 1 and further including:

means for monitoring temperature of the first heated roll; and, metering valve means for regulation of fluid flow to the manifold means dependent upon temperature of the first heated roll.

3. A heated roll and counter roll for treatment of a continuous sheet of goods in web form according to claim 1 and further including:

the plurality of nozzles is distributed over the axial length of the first heated roll.

4. A heated roll and counter roll for treatment of a continuous sheet of goods in web form according to claim 1 and further including:

the formed thermally insulating jacket is rigidly formed and supports the plurality of nozzles.

5. A heated roll and counter roll for treatment of a continuous sheet of goods in web form according to claim 1 and further including:

at least some of the plurality of nozzles is directed normal to the first heated roll.

6. A heated roll and counter roll for treatment of a continuous sheet of goods in web form according to claim 1 and further including:

a sensor for monitoring the continuous sheet of goods in web form; and, metering valve means responsive to the sensor for enabling fluid flow to the manifold means responsive to an interruption in the continuous sheet of goods in web form.

7. A process for utilizing heated roll and counter roll for treatment of a continuous sheet of goods in web form passing between the heated roll and the counter roll comprising:

providing a first heated roll rotatable about an axial length of a first axis;

providing a second counter-roll rotatable about a second axis parallel to the first axis;

relatively rotating the first heated roll and the second counter-roll and contacting the continuous sheet of goods in web form along a line of contact with the first heated roll;

placing a formed thermally insulating jacket defining a narrow interface around the first heated roll extending from the continuous sheet of goods in web form on a first side of the first heated roll to the continuous sheet of goods in web form on a second side of the first heated roll;

providing a plurality of nozzles at staggered radial locations relative to the first heated roll, the plurality of air nozzles extending through the formed thermally insulating jacket for supplying cooling air to the narrow interface between the formed thermally insulating jacket and the first heated roll; and, providing cooling fluid to the plurality of nozzles upon interruption of web movement between the first heated roll and the second counter roll.

8. A process for utilizing heated roll and counter roll for treatment of a continuous sheet of goods in web form according to claim 7 and including the further steps of:

sensing the temperature of the first heated roll; and, providing cooling fluid responsive to the sensed temperature.

9. A process for utilizing heated roll and counter roll for treatment of a continuous sheet of goods in web form according to claim 7 and including the further steps of:

monitoring the continuous sheet of goods in web form; and, providing cooling fluid responsive to the absence of continuous sheet of goods in web form.

* * * * *